(12) United States Patent
Kurata (10) Patent No.: US 7,720,602 B2
(45) Date of Patent: May 18, 2010

(54) POSITIONING DEVICE, METHOD OF CONTROLLING POSITIONING DEVICE, POSITIONING CONTROL PROGRAM, AND COMPUTER-READABLE RECORDING MEDIUM HAVING POSITIONING CONTROL PROGRAM RECORDED THEREON (75) Inventor: Tomoyuki Kurata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 591 days.

(21) Appl. No.: 11/711,649

(22) Filed: Feb. 28, 2007

(65) Prior Publication Data
US 2007/0260397 A1 Nov. 8, 2007

(30) Foreign Application Priority Data
Mar. 2, 2006 (JP) ............................. 2006-056457

(51) Int. Cl.
*G01C 21/00* (2006.01)
(52) U.S. Cl. .......................... 701/213; 701/1; 701/200; 701/202; 701/207; 701/209; 340/995.19; 342/357.14
(58) Field of Classification Search .................. 701/1, 701/207, 213, 216, 217, 220, 221, 200, 202, 701/209; 180/282; 342/357.14, 358; 340/995.19
See application file for complete search history.

(56) References Cited

U.S. PATENT DOCUMENTS

| 4,758,959 A | * | 7/1988 | Thoone et al. ............... 701/221 |
| 4,903,212 A | * | 2/1990 | Yokouchi et al. ............. 701/216 |
| 4,912,645 A | | 3/1990 | Kakihara et al. |
| 4,930,085 A | * | 5/1990 | Kleinschmidt .............. 701/207 |
| 5,058,023 A | | 10/1991 | Kozikaro |
| 5,166,882 A | * | 11/1992 | Stambaugh ................. 701/220 |
| 5,334,986 A | * | 8/1994 | Fernhout ................ 342/357.14 |
| 5,862,511 A | * | 1/1999 | Croyle et al. ................. 701/213 |

(Continued)

FOREIGN PATENT DOCUMENTS

JP        08068651 A   *   3/1996

(Continued)

OTHER PUBLICATIONS

Honey et al., a novel approach to automotive navigation and map display, Feb. 1987, IEEE Transactions on industrial electronics, vol. IE-34, No. 1, pp. 40-43.*

(Continued)

*Primary Examiner*—Khoi Tran
*Assistant Examiner*—Jaime Figueroa
(74) *Attorney, Agent, or Firm*—Global IP Counselors, LLP (57) ABSTRACT A positioning device includes a moving amount determination section which determines a moving amount of the device in a period between a preceding positioning time and a present positioning time; a moving amount evaluation section which determines whether or not the moving amount is within a predetermined allowable moving range; a positioning section which locates a position of the device based on a satellite signal which is a signal from a positioning satellite; an average position calculation section which calculates an average position by averaging a preceding located position and a present located position when the moving amount evaluation section has determined that the moving amount is within the predetermined allowable moving range; and a position output section which outputs the average position.

12 Claims, 8 Drawing Sheets

U.S. PATENT DOCUMENTS

| | | | | |
|---|---|---|---|---|
| 5,991,692 | A * | 11/1999 | Spencer et al. | 701/217 |
| 6,029,111 | A * | 2/2000 | Croyle | 701/207 |
| 6,038,495 | A * | 3/2000 | Schiffmann | 701/1 |
| 6,308,134 | B1 * | 10/2001 | Croyle et al. | 701/220 |
| 6,453,238 | B1 | 9/2002 | Brodie et al. | |
| 2005/0055160 | A1 * | 3/2005 | King | 701/213 |

FOREIGN PATENT DOCUMENTS

| | | |
|---|---|---|
| JP | H08-068651 A | 3/1996 |
| JP | H11-258324 A | 9/1999 |
| WO | WO-97/24577 | 7/1997 |
| WO | WO-97/24582 | 7/1997 |
| WO | WO-97/24584 | 7/1997 |

OTHER PUBLICATIONS

Larson, Gilbert C., Evaluation of an AVM system implemented citywide in St. Louis, Mar. 29, 1979, IEEE Vehicular Techonology Conference, vol. 29, pp. 378-383.*

Lezniak et al., A Dead Reckoning/Map Correlation System for Automatic Vehicle Tracking, Feb. 1977, IEEE Transaction on Vehicular Technology, vol. VT-26, No. 1, pp. 47-61.*

Tsumura et al., A system for measuring current position and/or heading of vehicles, May 1982, Bulletin of the JSME Japan Society of Mechanical Engineers, vol. 25, No. 203, pp. 821-826.*

* cited by examiner

FIG. 4A $V_x(t) = V(t)\cos\theta j(t)\cos\theta i(t)$
$V_y(t) = V(t)\cos\theta j(t)\sin\theta i(t)$
$V_z(t) = V(t)\sin\theta j(t)$ ACCELERATION SENSOR OUTPUT VALUE : a(t)
GYROSENSOR OUTPUT VALUES : $\theta i(t)$ and $\theta j(t)$
SAMPLING INTERVAL : dt (e.g. 100 ms)

$dx = \sum_{i=1}^{n} V_x(t) \cdot dt$
$dy = \sum_{i=1}^{n} V_y(t) \cdot dt$
$dz = \sum_{i=1}^{n} V_z(t) \cdot dt$

FIG. 4B

MOVING AMOUNT ACCUMULATED VALUE D $D = \sqrt{dx^2 + dy^2 + dz^2}$

* SAMPLING INTERVAL: dt (e.g. 100 ms)

ACCELERATION SENSOR OUTPUT VALUE a(t)

— VELOCITY v(t)

— GYROSENSOR OUTPUT VALUES $\theta i(t)$ and $\theta j(t)$

→ VELOCITY VECTOR V(t)

POSITIONING DEVICE, METHOD OF CONTROLLING POSITIONING DEVICE, POSITIONING CONTROL PROGRAM, AND COMPUTER-READABLE RECORDING MEDIUM HAVING POSITIONING CONTROL PROGRAM RECORDED THEREON

Japanese Patent Application No. 2006-56457 filed on Mar. 2, 2006, is hereby incorporated by reference in its entirety.

BACKGROUND OF THE INVENTION

The present invention relates to a positioning device using a signal from a positioning satellite, a method of controlling a positioning device, a positioning control program, and a computer-readable recording medium having a positioning control program recorded thereon.

A positioning system has been used which locates the present position of a GPS receiver utilizing a global positioning system (GPS) (satellite navigation system) or the like.

The GPS receiver receives signals from three or more GPS satellites, and calculates the distance between each GPS satellite and the GPS receiver (hereinafter called "pseudo-range") from the difference between the time at which the signal is transmitted from each GPS satellite and the time at which the signal reaches the GPS receiver (hereinafter called "delay time"), for example. The GPS receiver calculates (locates) the present position using the pseudo-range and satellite orbital information of each GPS satellite contained in the signal received from each GPS satellite.

However, when the signal from the GPS satellite reaches the GPS receiver after being reflected by a building or the like, or the signal strength is weak, or the dilution of precision (DOP) of the GPS satellite in the sky is low, the located position may significantly differ from the true position, whereby the accuracy of the located position may deteriorate.

On the other hand, technology has been proposed which calculates the present expected position (hereinafter called "expected position") from the velocity vector and the elapsed time based on the preceding position, and averages the expected position and the present located position (e.g. JP-A-8-68651 (e.g. FIG. 5)).

However, the GPS satellite moves in the satellite orbit even when the GPS receiver stands still, and the reception state of the satellite signal changes from moment to moment. Therefore, the velocity indicated by the velocity vector does not necessarily become zero.

According to the above technology, when the elapsed time is 10 seconds, the expected position differs from the preceding position at a distance corresponding to 10 seconds even when the GPS receiver stands still. As a result, the accuracy of the position after averaging deteriorates, whereby the output position may differ from the true position.

According to the above technology, when the GPS receiver stands still, the expected position cumulatively differs from the preceding position as the time elapsed from the preceding positioning increases, whereby the output position differs from the true position.

Moreover, the accuracy of the velocity vector calculated based on the signal from the GPS satellite deteriorates depending on the signal reception state and the like.

SUMMARY

According to one aspect of the invention, there is provided a positioning device comprising:

a moving amount determination section which determines a moving amount of the device in a period between a preceding positioning time and a present positioning time;

a moving amount evaluation section which determines whether or not the moving amount is within a predetermined allowable moving range;

a positioning section which locates a position of the device based on a satellite signal which is a signal from a positioning satellite; and a position output section which outputs a preceding located position when the moving amount evaluation section has determined that the moving amount is within the predetermined allowable moving range.

According to anther aspect of the invention, there is provided a positioning device comprising:

a moving amount determination section which determines a moving amount of the device in a period between a preceding positioning time and a present positioning time;

a moving amount evaluation section which determines whether or not the moving amount is within a predetermined allowable moving range;

a positioning section which locates a position of the device based on a satellite signal which is a signal from a positioning satellite;

an average position calculation section which calculates an average position by averaging a preceding located position and a present located position when the moving amount evaluation section has determined that the moving amount is within the predetermined allowable moving range; and a position output section which outputs the average position.

DETAILED DESCRIPTION OF THE EMBODIMENT

The invention may provide a positioning device which can improve the accuracy of the output position during a stationary state, a method of controlling a positioning device, a positioning control program, and a computer-readable recording medium having a positioning control program recorded thereon.

According to one embodiment of the invention, there is provided a positioning device comprising:

a moving amount determination section which determines a moving amount of the device in a period between a preceding positioning time and a present positioning time;

a moving amount evaluation section which determines whether or not the moving amount is within a predetermined allowable moving range;

a positioning section which locates a position of the device based on a satellite signal which is a signal from a positioning satellite; and a position output section which outputs a preceding located position when the moving amount evaluation section has determined that the moving amount is within the predetermined allowable moving range.

According to this embodiment, the positioning device can output the preceding located position when the positioning device has determined that the moving amount is within the predetermined allowable moving range. Specifically, the positioning device does not average (correct) the expected position estimated from the preceding located position, the preceding velocity vector, and the elapsed time and the present located position and output the average position. The positioning device outputs the preceding located position. Therefore, the accuracy of the preceding velocity vector does not affect correction of the present located position.

When the positioning device stands still, the preceding located position is indicated by the coordinates near the true position. This means that the true position exists near the preceding located position when the positioning device stands still. On the other hand, the true position does not necessarily exist near the expected position.

Therefore, the output position becomes close to the true position by outputting the preceding located position in comparison with the case of outputting a position obtained by averaging the expected position and the present located position.

This improves the accuracy of the output position during a stationary state.

According to another embodiment of the invention, there is provided a positioning device comprising:

a moving amount determination section which determines a moving amount of the device in a period between a preceding positioning time and a present positioning time;

a moving amount evaluation section which determines whether or not the moving amount is within a predetermined allowable moving range;

a positioning section which locates a position of the device based on a satellite signal which is a signal from a positioning satellite;

an average position calculation section which calculates an average position by averaging a preceding located position and a present located position when the moving amount evaluation section has determined that the moving amount is within the predetermined allowable moving range; and a position output section which outputs the average position.

According to this embodiment, since the positioning device includes the average position calculation section, the positioning device can calculate the average position when the positioning device has determined that the moving amount is within the predetermined allowable moving range. Specifically, the positioning device does not average (correct) the expected position estimated from the preceding located position, the preceding velocity vector, and the elapsed time and the present located position. The positioning device averages the preceding located position and the present located position. Therefore, the accuracy of the preceding velocity vector does not affect correction of the present located position.

When the positioning device stands still, the preceding located position and the present located position are indicated by the coordinates near the true position. This means that the true position exists near the preceding located position and the present located position when the positioning device stands still. On the other hand, the true position does not necessarily exist near the expected position.

Therefore, the output position becomes close to the true position by averaging the preceding located position and the present located position and outputting the average position in comparison with the case of outputting a position obtained by averaging the expected position and the present located position.

This improves the accuracy of the output position during a stationary state.

In the positioning device according to this embodiment, the position output section may output a present located position when the moving amount evaluation section has determined that the moving amount is outside the predetermined allowable moving range.

According to this embodiment, the positioning device can directly output the located position without correcting the located position when the moving amount evaluation section has determined that the moving amount is outside the predetermined allowable moving range.

Therefore, a position which reflects the actual moving state can be output when the positioning device is moving. Specifically, the positioning device can improve the ability to follow during movement.

According to a further embodiment of the invention, there is provided a method of controlling a positioning device comprising:

a moving amount determination step of determining a moving amount in a period between a preceding positioning time and a present positioning time;

a moving amount evaluation step of determining whether or not the moving amount is within a predetermined allowable moving range;

a positioning step of locating a present position based on a satellite signal which is a signal from a positioning satellite;

an average position calculation step of calculating an average position by averaging a preceding located position and a present located position when the moving amount has been determined to be within the predetermined allowable moving range in the moving amount evaluation step; and a position output step of outputting the average position.

This improves the accuracy of the output position during a stationary state.

According to a further embodiment of the invention, there is provided a positioning control program causing a computer to execute:

a moving amount determination step of determining a moving amount of the computer in a period between a preceding positioning time and a present positioning time;

a moving amount evaluation step of determining whether or not the moving amount is within a predetermined allowable moving range;

a positioning step of locating a position of the computer based on a satellite signal which is a signal from a positioning satellite;

an average position calculation step of calculating an average position by averaging a preceding located position and a present located position when the moving amount has been determined to be within the predetermined allowable moving range in the moving amount evaluation step; and a position output step of outputting the average position.

According to a further embodiment of the invention, there is provided a computer-readable recording medium having recorded thereon a positioning control program which causes a computer to execute:

a moving amount determination step of determining a moving amount of the computer in a period between a preceding positioning time and a present positioning time;

a moving amount evaluation step of determining whether or not the moving amount is within a predetermined allowable moving range;

a positioning step of locating a position of the computer based on a satellite signal which is a signal from a positioning satellite; and a position output step of outputting a preceding located position when the moving amount has been determined to be within the predetermined allowable moving range in the moving amount evaluation step.

Preferred embodiments of the invention are described below in detail with reference to the drawings and the like.

The following embodiments illustrate specific preferred examples of the invention and are provided with various technologically preferred limitations. Note that the scope of the invention is not limited to these aspects unless there is a description which limits the invention.

First Embodiment

Figure 1:
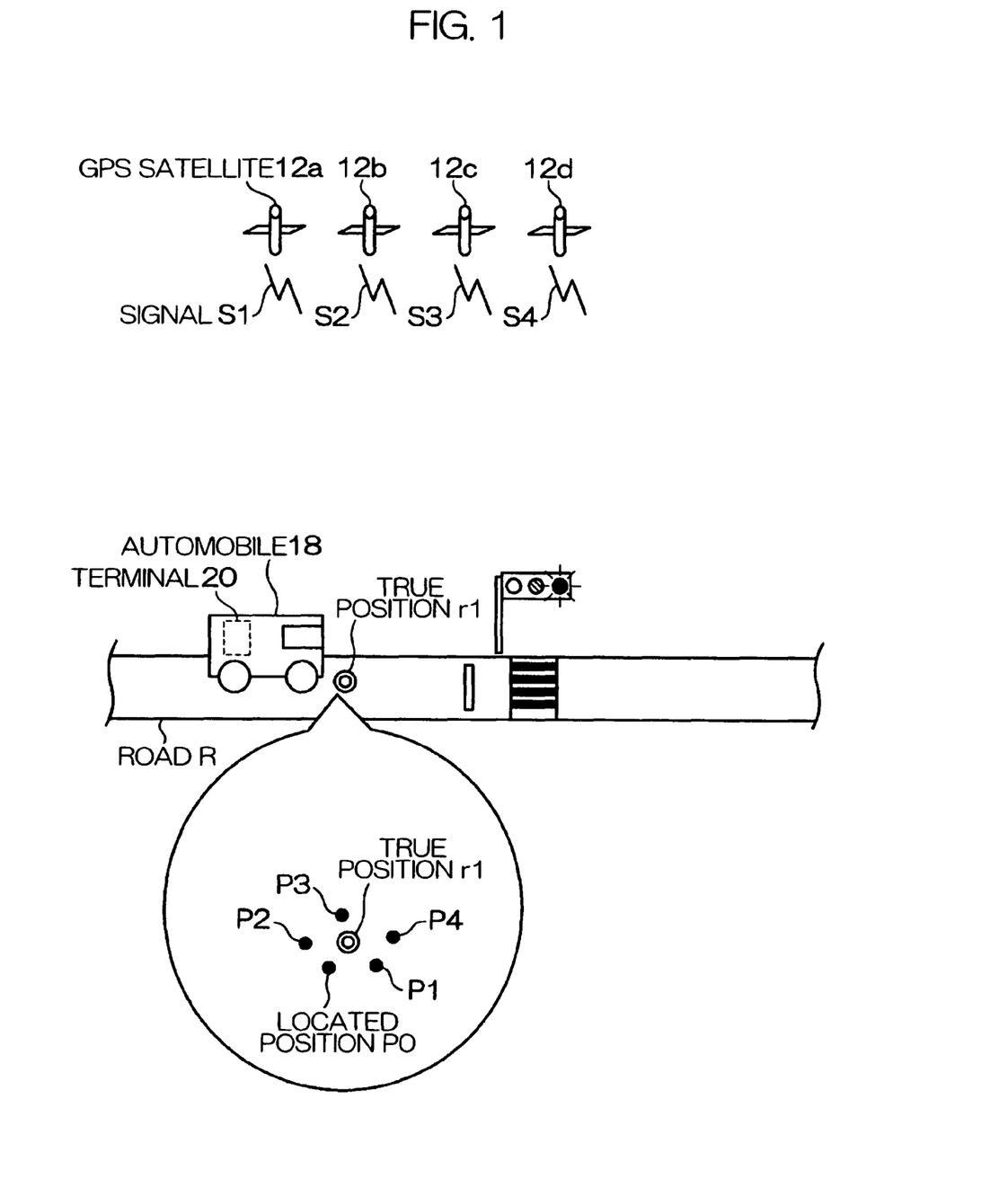
FIG. 1 is a schematic view showing a terminal and the like according to one embodiment of the invention.

FIG. 1 is a schematic view showing a terminal 20 and the like according to a first embodiment of the invention.

As shown in FIG. 1, the terminal 20 is provided in an automobile 18. The terminal 20 can receive signals S1, S2, S3, and S4 from GPS satellites 12a, 12b, 12c, and 12d (positioning satellites), for example. The signal S1 and the like exemplify a satellite signal. The terminal 20 exemplifies a positioning device.

The automobile 18 is positioned on a road R. Since the traffic signal is a red light, the driver has stopped the automobile 18 near the stop line in front of the crossing. Accordingly, the terminal 20 stands still.

The true position of the terminal 20 is a position r1.

However, since the GPS satellite 12a and the like move in the satellite orbits so that the reception state of the signal S1 and the like changes from moment to moment, the located position also changes from moment to moment. For example, the located position changes in the order of P0, P1, P2, P3, and P4 with the passage of time. However, since the true position r1 is fixed when the terminal 20 stands still, the located position P0 and the like are indicated by the coordinates near the true position r1.

When the terminal 20 stands still, the terminal 20 can ensure the stability of the output position as described below, even if the located position P0 and the like change.

The terminal 20 is a car navigation system which continuously calculates (locates) the position on the road R and displays the acquired position information together with map information, for example.

The terminal 20 may be a portable telephone, a personal handy-phone system (PHS), a personal digital assistance (PDA), or the like instead of a car navigation system. Note that the terminal 20 is not limited thereto.

The number of GPS satellites 12a and the like is not limited to four. For example, the number of GPS satellites 12a and the like may be three or five or more.

(Main Hardware Configuration of Terminal 20)

Figure 2:
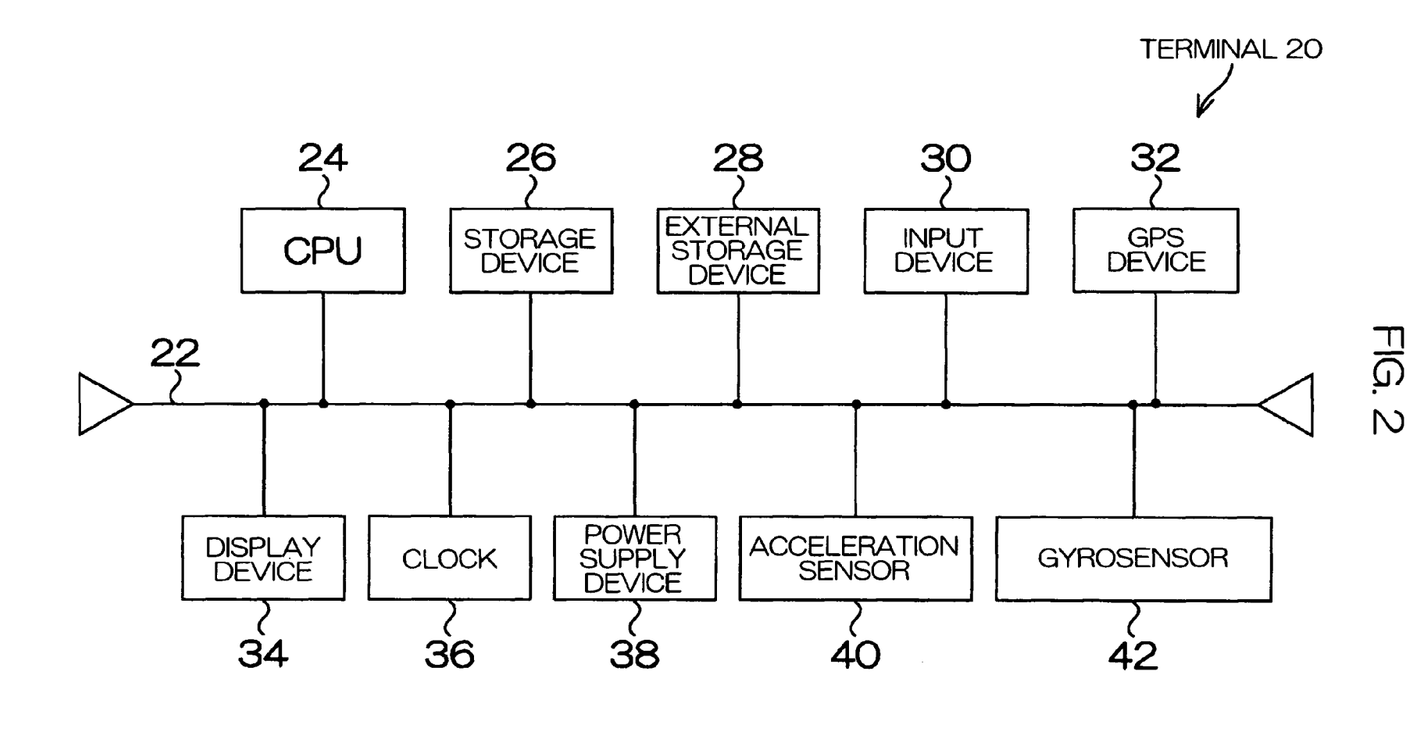
FIG. 2 is a schematic view showing the main hardware configuration of the terminal.

FIG. 2 is a schematic view showing the main hardware configuration of the terminal 20.

As shown in FIG. 2, the terminal 20 includes a computer, and the computer includes a bus 22.

A central processing unit (CPU) 24, a storage device 26, an external storage device 28, and the like are connected with the bus 22. The storage device 26 is a random access memory (RAM), a read only memory (ROM), or the like. The external storage device 28 is a hard disk drive (HDD) or the like.

An input device 30 for inputting various types of information and the like, a GPS device 32 for receiving the signal S1 and the like from the GPS satellite 12a and the like, a display device 34 for displaying various types of information, a clock 36, and a power supply device 38 are also connected with the bus 22.

An acceleration sensor 40 is also connected with the bus 22. The acceleration sensor 40 is a piezoresistive triaxial acceleration sensor, for example. The acceleration sensor 40 is formed so that a weight is supported by a thin silicon beam, the beam is deformed when the weight moves due to acceleration, and the deformation is detected by a change in the resistance of a piezoresistive element formed on the beam to detect the acceleration. For example, the acceleration sensor 40 is formed by combining three acceleration sensors so that acceleration in a three-dimensional space can be detected separately for triaxial components (x, y, and z axes). The rated acceleration of the acceleration sensor 40 is ±4 G, for example.

A gyrosensor 42 is also connected with the bus 22. The gyrosensor 42 is a vibration gyrosensor using a rock crystal as a gyro-element, for example. When applying an AC voltage to the gyro-element, the gyro-element repeatedly performs a pendulum motion in the horizontal direction at a high frequency, for example. A Coriolis force occurs when the gyro-element rotates to cause the gyro-element to vibrate in the direction perpendicular to the direction of the pendulum motion. A current corresponding to the rotation rate and the angular velocity is generated due to the vibration in the vertical direction. The gyrosensor detects a current signal due to the above current as a voltage to detect the moving direction. The gyrosensor 42 is formed by combining three gyrosensors so that the moving direction in three dimensions can be detected, for example.

(Main Software Configuration of Terminal 20)

Figure 3:
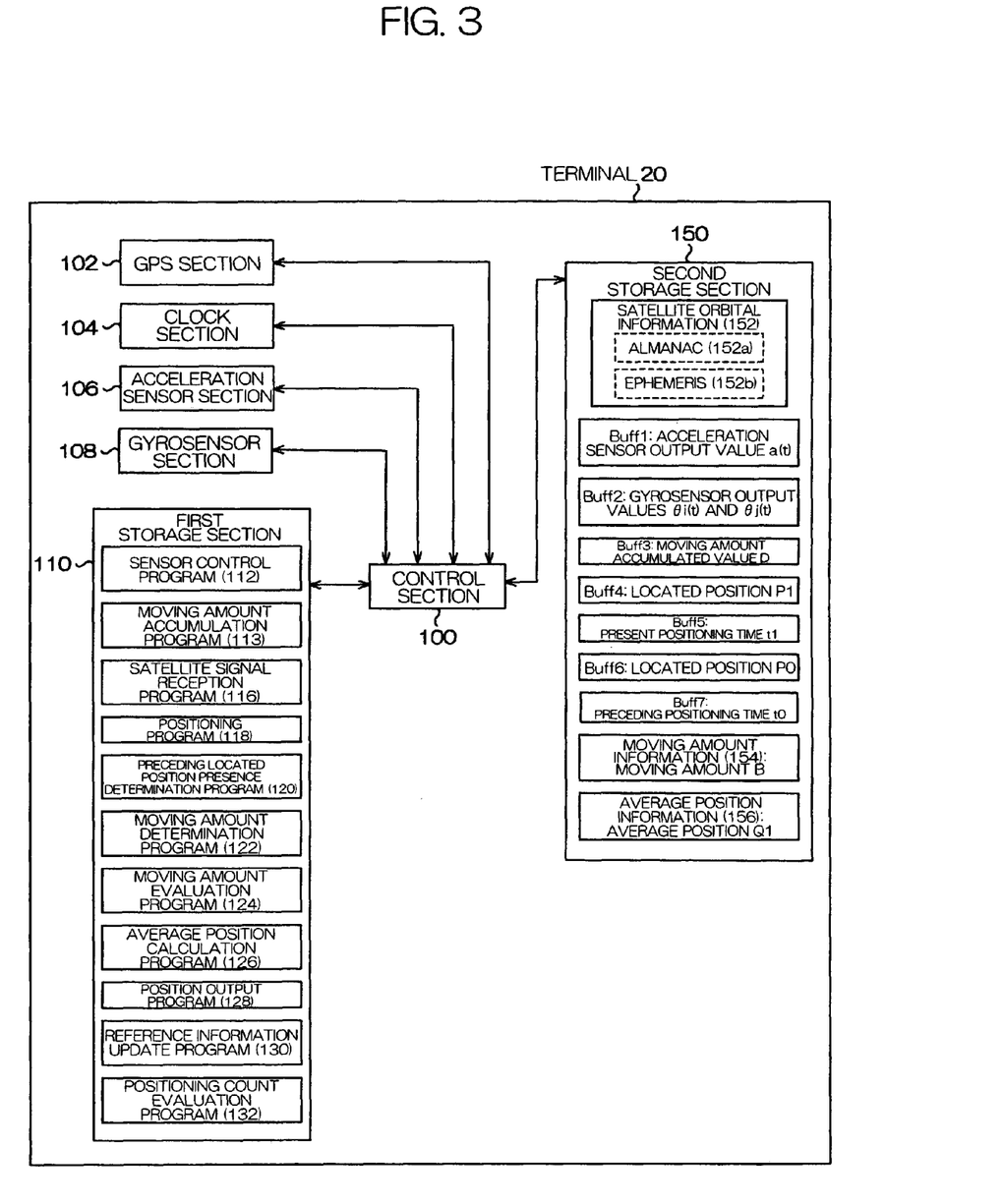
FIG. 3 is a schematic view showing the main software configuration of the terminal.

FIG. 3 is a schematic view showing the main software configuration of the terminal 20.

As shown in FIG. 3, the terminal 20 includes a control section 100 which controls each section, a GPS section 102 corresponding to the terminal GPS device 32 shown in FIG. 2, a clock section 104 corresponding to the clock 36, and the like.

The terminal 20 also includes an acceleration sensor section 106 corresponding to the acceleration sensor 40, and a gyrosensor section 108 corresponding to the gyrosensor 42. The gyrosensor section 108 exemplifies a moving direction detection section.

The terminal 20 also includes a first storage section 110 which stores various programs, and a second storage section 150 which stores various types of information.

As shown in FIG. 3, the terminal 20 stores satellite orbital information 152 in the second storage section 150. The satellite orbital information 152 includes an almanac 152a and an ephemeris 152b. The almanac 152a is information indicating the approximate orbits of all the GPS satellites 12a and the like (see FIG. 1) together with the acquisition time. The almanac 152a can be decoded and acquired from the signal S1 and the like from the GPS satellite 12a and the like.

The ephemeris 152b is information indicating the accurate orbit of each GPS satellite 12a and the like (see FIG. 1). For example, in order to acquire the ephemeris 152b of the GPS satellite 12a, it is necessary to receive the signal S1 from the GPS satellite 12a and decode the signal S1 to acquire the ephemeris 152b.

The terminal 20 uses the satellite orbital information 152 for positioning.

As shown in FIG. 3, the terminal 20 stores a sensor control program 112 in the first storage section 110. The sensor control program 112 is a program for causing the control section 100 to control the operations of the acceleration sensor 40 and the gyrosensor 42.

When power is supplied to the terminal 20, the control section 100 activates the acceleration sensor 40 and the gyrosensor 42. The acceleration sensor 40 and the gyrosensor 42 detect the acceleration and the moving direction at sampling intervals of 100 milliseconds (ms), for example.

Figure 4A:
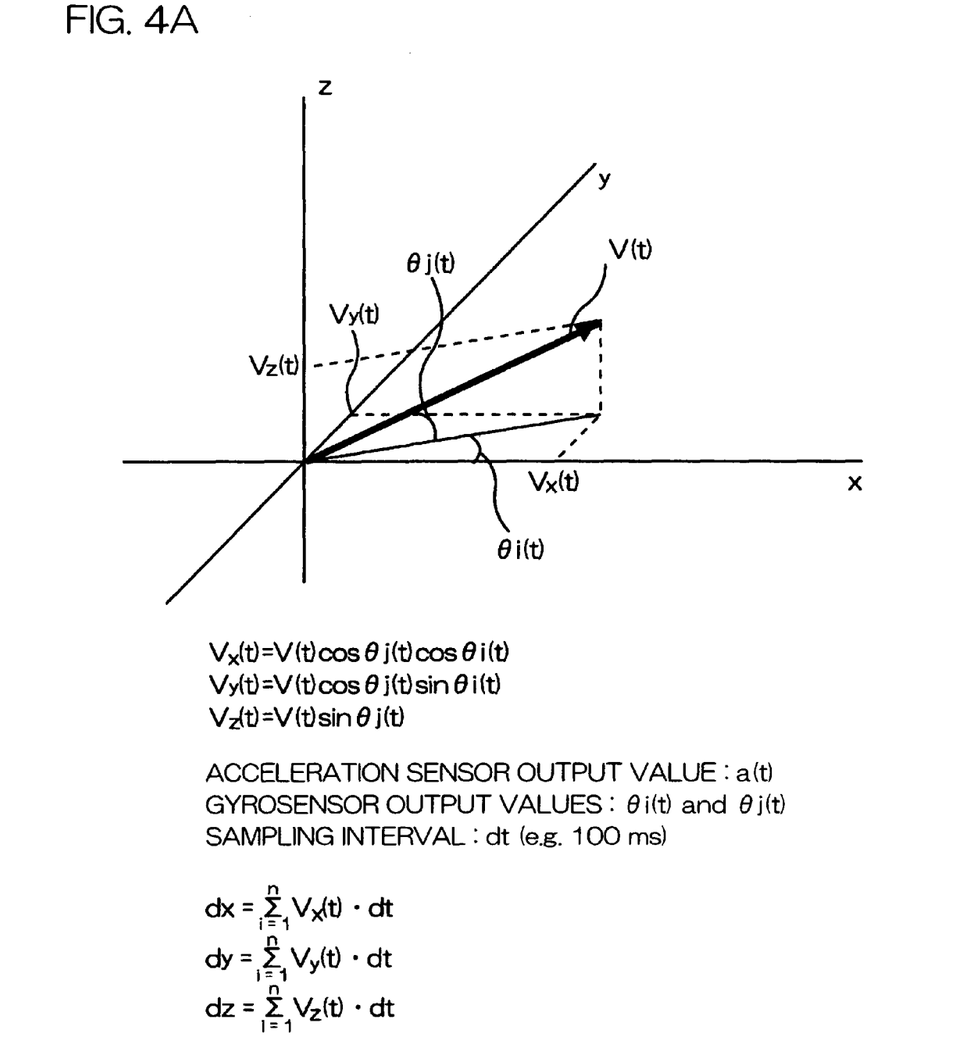
FIG. 4A is a view illustrative of the processing of a moving amount accumulation program.

FIG. 4A is a view illustrative of the processing of a moving amount accumulation program.

As shown in FIG. 4A, the acceleration sensor 40 outputs an acceleration a(t) (hereinafter called "acceleration sensor output value a(t)") at a time t. The control section 100 stores the acceleration sensor output value a(t) in a buffer Buff1 of the second storage section 150.

The gyrosensor 42 outputs output values $\theta i(t)$ and $\theta j(t)$ (hereinafter called "gyrosensor output values $\theta i(t)$ and $\theta j(t)$") at the time t. The control section 100 stores the output values $\theta i(t)$ and $\theta j(t)$ in a buffer Buff2. The output value $\theta i(t)$ indicates the moving angle in a horizontal plane. The output value $\theta j(t)$ indicates the moving angle in the elevation angle direction.

As shown in FIG. 3, the terminal 20 stores a moving amount accumulation program 113 in the first storage section 110. The moving amount accumulation program 113 is a program for causing the control section 100 to accumulate the moving amount of the terminal 20.

As shown in FIG. 4A, the control section 100 integrates the acceleration indicated by the acceleration sensor output value a(t) to calculate the velocity V(t) at the time t. The control section 100 calculates the velocity V(t) every 100 milliseconds, for example.

The control section 100 separates the velocity V(t) into an x-axis component, a y-axis component, and a z-axis component based on the gyrosensor output values $\theta i(t)$ and $\theta j(t)$.

The control section 100 accumulates the moving amount for each of the x-axis component, the y-axis component, and the z-axis component. Since the acceleration sensor 40 is formed by combining three acceleration sensors, the x-axis component acceleration sensor uses only the x-axis component of the velocity V(t). Likewise, the y-axis component acceleration sensor uses only the y-axis component, and the z-axis component acceleration sensor uses only the z-axis component.

Figure 4B:
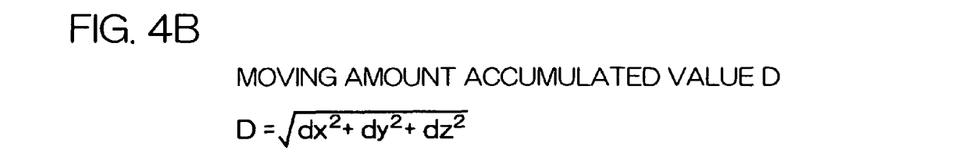
FIG. 4B is a view showing a moving amount accumulated value calculation expression.

As shown in FIG. 4B, the control section 100 calculates the total moving amount D (hereinafter called "moving amount accumulated value D") of the terminal 20 from the moving amount of each axis component.

The gyrosensor output values $\theta i(t)$ and $\theta j(t)$ are used to calculate the moving amount accumulated value D in addition to the acceleration sensor output value a(t) in order to prevent cumulative errors from being accumulated in the acceleration sensor output value a(t). Specifically, the gyrosensor output values $\theta i(t)$ and $\theta j(t)$ are used to improve the accuracy of the moving amount accumulated value D. The cumulative error is described below taking the acceleration sensor which detects the x-axis component as an example. The acceleration sensor which detects the x-axis component is secured to the terminal 20. When the terminal 20 is inclined, the acceleration sensor is also inclined with respect to the absolute coordinate axis. Therefore, the output value from the acceleration sensor is inclined corresponding to the inclination of the terminal 20 with respect to the absolute coordinate axis. Specifically, the velocity V(t) before being separated into the x-axis component, the y-axis component, and the z-axis component does not necessarily indicate the moving velocity in the x-axis direction on the absolute coordinate axis. Therefore, when integrating the velocity V(t) in a specific unit time, a large amount of cumulative error occurs in the moving velocity in the x-axis direction on the absolute coordinate axis. On the other hand, the gyrosensor 42 allows "V(t)cos $\theta j(t)$×cos $\theta i(t)$" to be calculated as the moving velocity Vx(t) in the x-axis direction on the absolute coordinate axis.

The control section 100 stores the moving amount accumulated value D in a buffer Buff3.

As shown in FIG. 3, the terminal 20 stores a satellite signal reception program 116 in the first storage section 110. The satellite signal reception program 116 is a program for causing the control section 100 to receive the signal S1 and the like from the GPS satellite 12a and the like.

In more detail, the control section 100 determines the GPS satellite 12a and the like which can be observed at the present time referring to the almanac 152a, and receives the signal S1 and the like from the observable GPS satellite 12a and the like. In this case, the preceding located position is used as the position of the terminal 20 (reference), for example.

As shown in FIG. 3, the terminal 20 stores a positioning program 118 in the first storage section 110. The positioning program 118 is a program for causing the control section 100 to locate the present position and calculate the located position P1 based on the signal S1 and the like received by the GPS section 102. The located position P1 exemplifies a located position. The positioning program 118 and the control section 100 exemplify a positioning section. The control section 100 locates the position once within one second (s), for example. The sampling interval of the acceleration sensor 40 and the gyrosensor 42 is set to be shorter than this positioning interval.

In more detail, the control section 100 receives the signal S1 and the like from three or more GPS satellites 12a and the like, and calculates the pseudo-range (distance between each GPS satellite 12a and the like and the terminal 20) from the delay time which is the difference between the time at which the signal S1 and the like are transmitted from the GPS satellite 12a and the like and the time at which the signal S1 and the like reach the terminal 20. The control section 100 calculates (locates) the present position using the ephemeris 152b of the GPS satellite 12a and the like and the pseudo-range.

The control section 100 stores the present located position P1 in a buffer Buff4 of the second storage section 150.

The control section 100 stores a present positioning time t1 (time at which the located position P1 is calculated based on the positioning program 114) in a buffer Buff5 of the second storage section 150.

After outputting an average position Q1 described later or the located position P1 (hereinafter called "after position output"), the control section 100 stores the present located position P1 in a buffer Buff6 of the second storage section 150 as the preceding located position P0. The control section 100 stores the present positioning time t1 in a buffer Buff7 of the second storage section 150 as the preceding positioning time t0 after position output. There may be a case where positioning calculations are not completed due to the weakness of the signal S1 and the like, whereby the present located position P1 is not calculated. In this case, the control section 100 stores data indicating the absence of the located position in the buffer Buff6 after position output.

As shown in FIG. 3, the terminal 20 stores a preceding located position presence determination program 120 in the first storage section 110. The preceding located position presence determination program 120 is a program for causing the control section 100 to determine whether or not the located position P0 is stored in the buffer Buff6.

As shown in FIG. 3, the terminal 20 stores a moving amount determination program 122 in the first storage section 110. The moving amount determination program 122 is a program for causing the control section 100 to determine the moving amount B of the terminal 20 in a period between the preceding positioning time t0 and the present positioning time t1. The moving amount determination program 122 and the control section 100 exemplify a moving amount determination section.

In more detail, the control section 100 acquires the moving amount accumulated value D when positioning has been completed.

The control section 100 sets the moving amount accumulated value D at zero when positioning has been completed, and again starts calculating the moving amount accumulated value D.

The control section 100 sets the moving amount accumulated value D when positioning has been completed as a moving amount B. The control section 100 stores moving amount information 154 indicating the moving amount B in the second storage section 150.

As shown in FIG. 3, the terminal 20 stores a moving amount evaluation program 124 in the first storage section 110. The moving amount evaluation program 124 is a program for causing the control section 100 to determine whether or not the moving amount B in a period between the preceding positioning time and the present positioning time is within 1 meter (m), for example. A moving amount within two meters exemplifies a predetermined allowable moving range. The moving amount evaluation program 124 and the control section 100 exemplify a moving amount evaluation section.

As shown in FIG. 3, the terminal 20 stores an average position calculation program 126 in the first storage section 110. The average position calculation program 126 is a program for causing the control section 100 to calculate an average position Q1 by averaging the preceding located position P0 and the present located position P1 when the moving amount B in a period between the preceding positioning time and the present positioning time is within 1 meter (m), for example. The average position Q1 exemplifies an average position. The average position calculation program 126 and the control section 100 exemplify an average position calculation section.

A range of 1 meter is the range in which it is determined that the terminal 20 stands still, taking an error of the acceleration sensor 40 into consideration. The error of the acceleration sensor 40 is 1%, for example.

Figure 5:
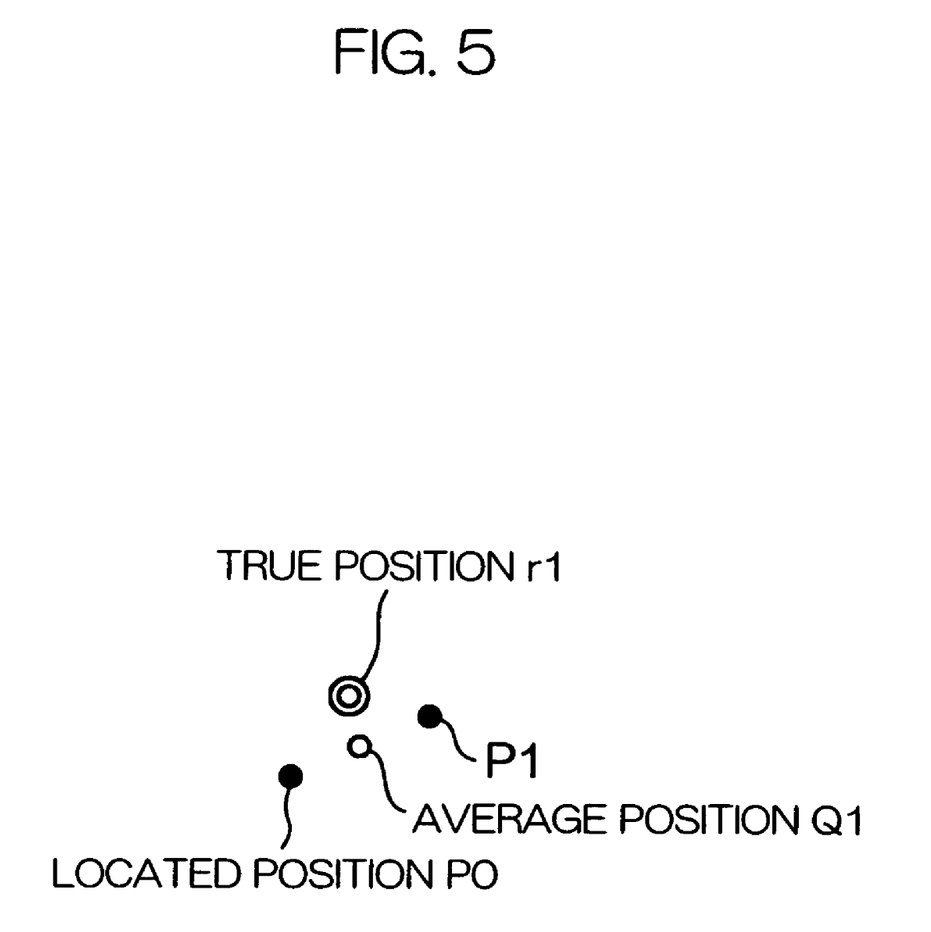
FIG. 5 is a view illustrative of an average position calculation program.

FIG. 5 is a view illustrative of the average position calculation program 126.

As shown in FIG. 5, the control section 100 calculates the last located position P0, the present located position P1, and the average position Q1 which is the intermediate position with respect to the latitude, the longitude, and the altitude.

Since the terminal 20 stands still, the located position P0 and the located position P1 are positions indicated by the coordinates near the true position r1. This means that the true position r1 exists near the located position P0 and the located position P1. Therefore, it is likely that the average position Q1 of the located position P0 and the located position P1 is close to the true position r1.

As shown in FIG. 3, the terminal 20 stores a position output program 128 in the first storage section 110. The position output program 128 is a program for causing the control section 100 to output either the average position Q1 or the located position P1. The position output program 128 and the control section 100 exemplify a position output section.

In more detail, the control section 100 displays the average position Q1 on the display device 34 (see FIG. 2) when the moving amount B in a period between the preceding positioning time and the present positioning time is within 1 meter (m).

On the other hand, the control section 100 displays the located position P1 on the display device 34 when the moving amount B in a period between the preceding positioning time and the present positioning time is greater than 1 meter (m), for example.

As shown in FIG. 3, the terminal 20 stores a reference information update program 130 in the first storage section 110. The reference information update program 130 is a program for causing the control section 100 to store the present located position P1 in the buffer Buff6 as the located position P0 and store the present positioning time t1 in the buffer Buff7 as the preceding positioning time t0.

As shown in FIG. 3, the terminal 20 stores a positioning count evaluation program 132 in the first storage section 110. The positioning count evaluation program 132 is a program for causing the control section 100 to determine whether or not positioning has been performed γ times which is the number of times specified in advance. The γ times exemplifies the number of times specified in advance. The γ times is 10, for example. The terminal 20 locates the position 10 times within one second (s), and calculates the located position P1 10 times.

The control section 100 finishes the positioning operation when the control section 100 has determined that positioning has been performed 10 times.

The terminal 20 is configured as described above.

As described above, the terminal 20 can calculate the average position Q1 when the moving amount B in a period between the preceding positioning time and the present positioning time is within 1 meter (m). Specifically, the terminal 20 does not average (correct) the expected position estimated from the preceding located position P0 and the last velocity vector and the present located position P1. The terminal 20 averages the preceding located position P0 and the present located position P1 when the moving amount B in a period between the preceding positioning time and the present positioning time is within 1 meter (m), for example. Therefore, the accuracy of the preceding velocity vector does not affect correction of the present located position P1.

When the terminal 20 stands still, the preceding located position P0 and the present located position P1 are indicated by the coordinates near the true position r1 (see FIG. 5). This means that the true position r1 exists near the preceding located position P0 and the present located position P1. Therefore, the output position (average position Q1) becomes close to the true position by averaging the preceding located position P0 and the present located position P1 and outputting the average position Q1 in comparison with the case of outputting the position obtained by averaging the expected position and the present located position P1.

The distance between the average position Q1 and the true position r1 is statistically shorter than the distance between the preceding located position P0 and the true position r1 or the distance between the present located position P1 and the true position r1. Therefore, it is likely that the average position Q1 is closer to the true position r1 than the preceding located position P0 and the present located position P1.

This improves the accuracy of the output position (average position Q1) during a stationary state.

The terminal 20 is configured to output the present located position P1 when the moving amount B in a period between the preceding positioning time and the present positioning time is greater than 1 meter (m), for example. Specifically, the terminal 20 does not correct the present located position P1 using the preceding located position P0 or the like.

Therefore, a position which reflects the actual moving state can be output when the terminal 20 is moving. Specifically, the terminal 20 can improve the ability to follow during movement.

The configuration of the terminal 20 according to the first embodiment has been described above. An operation example of the terminal 20 is described below mainly using FIG. 6.

Figure 6:
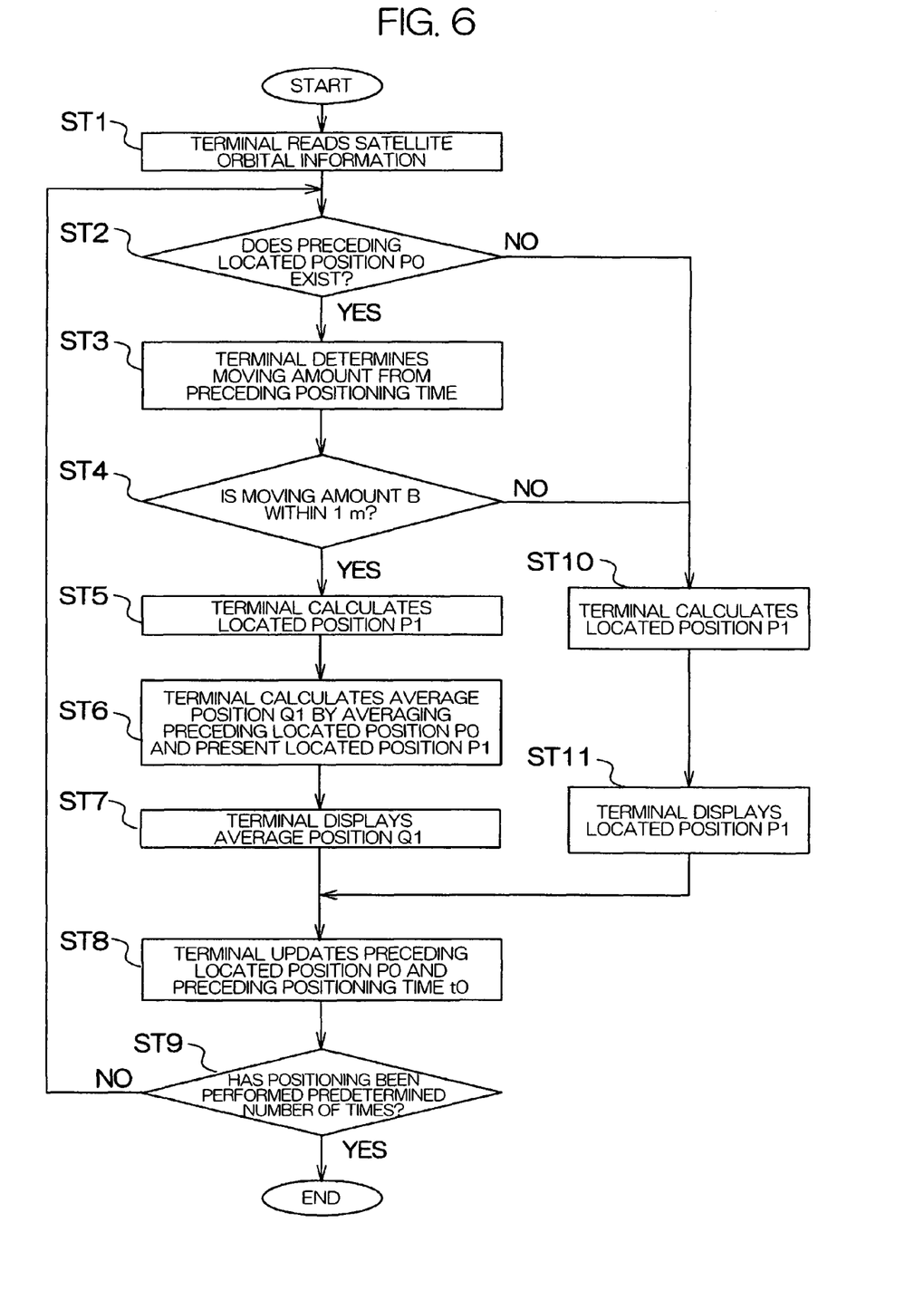
FIG. 6 is a schematic flowchart showing an operation example of the terminal.

FIG. 6 is a schematic flowchart showing an operation example of the terminal 20.

The terminal 20 reads the satellite orbital information 152 (step ST1 in FIG. 6).

The terminal 20 determines whether or not the preceding located position P0 exists (step ST2).

When the terminal 20 has determined that the preceding located position P0 exists in the step ST2, the terminal 20 determines the moving amount B from the preceding positioning time (step ST3). The step ST3 exemplifies a moving amount determination step.

The terminal 20 determines whether or not the moving amount B is within 1 meter (m) (step ST4). The step ST4 exemplifies a moving amount evaluation step.

The terminal 20 locates the present position and calculates the located position P1 (step ST5). The step ST5 exemplifies a located position calculation step.

When the terminal 20 has determined that the moving amount B is within 1 meter (m) in the step ST4, the terminal 20 calculates the average position Q1 by averaging the preceding located position P0 and the present located position P1 (step ST6). The step ST6 exemplifies an average position calculation step.

The terminal 20 displays the average position Q1 (step ST7). The step ST7 exemplifies a position output step.

The terminal 20 updates the located position P0 and the preceding positioning time t0 (step ST8). Specifically, the terminal 20 stores the present located position P1 in the buffer Buff6 as the preceding located position P0, and stores the present positioning time t1 in the buffer Buff7 as the preceding positioning time t0.

The terminal 20 determines whether or not positioning has been performed 10 times (number of times specified in advance) (step ST9).

When the terminal 20 has determined that positioning has not been performed 10 times in the step ST9, the terminal 20 returns to the step ST2.

When the terminal 20 has determined that the preceding located position P0 does not exist in the step ST2, the terminal 20 calculates the located position P1 (step ST10), and displays the located position P1 (step ST11).

When the terminal 20 has determined that the moving amount B from the preceding positioning time is not within 1 meter in the step ST4, the terminal 20 also calculates the located position P1 (step ST10), and displays the located position P1 (step ST11).

The accuracy of the output position (average position Q1) during a stationary state can be improved by the above steps.

Moreover, a position which reflects the actual moving state can be output when the terminal 20 does not stand still. Specifically, the terminal 20 can improve the ability to follow during movement.

Note that the terminal 20 may output the preceding located position P0 without calculating the average position Q1 when the terminal 20 has determined that the moving amount B is within 1 meter (m), differing from this embodiment. In this case, the position output program 128 and the control section 100 exemplify a position output section which outputs the preceding located position P0 when the terminal 20 has determined that the moving amount B is within a predetermined allowable moving range.

When the terminal 20 stands still, the preceding located position is indicated by the coordinates near the true position. This means that the true position r1 exists near the preceding located position P0 when the terminal 20 stands still. On the other hand, the true position r1 does not necessarily exist near the expected position.

Therefore, the output position becomes close to the true position by outputting the preceding located position P0 in comparison with the case of outputting a position obtained by averaging the expected position and the present located position.

This improves the accuracy of the output position during a stationary state.

Second Embodiment

A terminal 20A according to a second embodiment is described below. The terminal 20A is mainly configured in the same manner as the terminal 20 according to the first embodiment. Therefore, the same sections are indicated by the same symbols, and description thereof is omitted. The following description mainly focuses on the difference from the terminal 20 according to the first embodiment.

Figure 7:
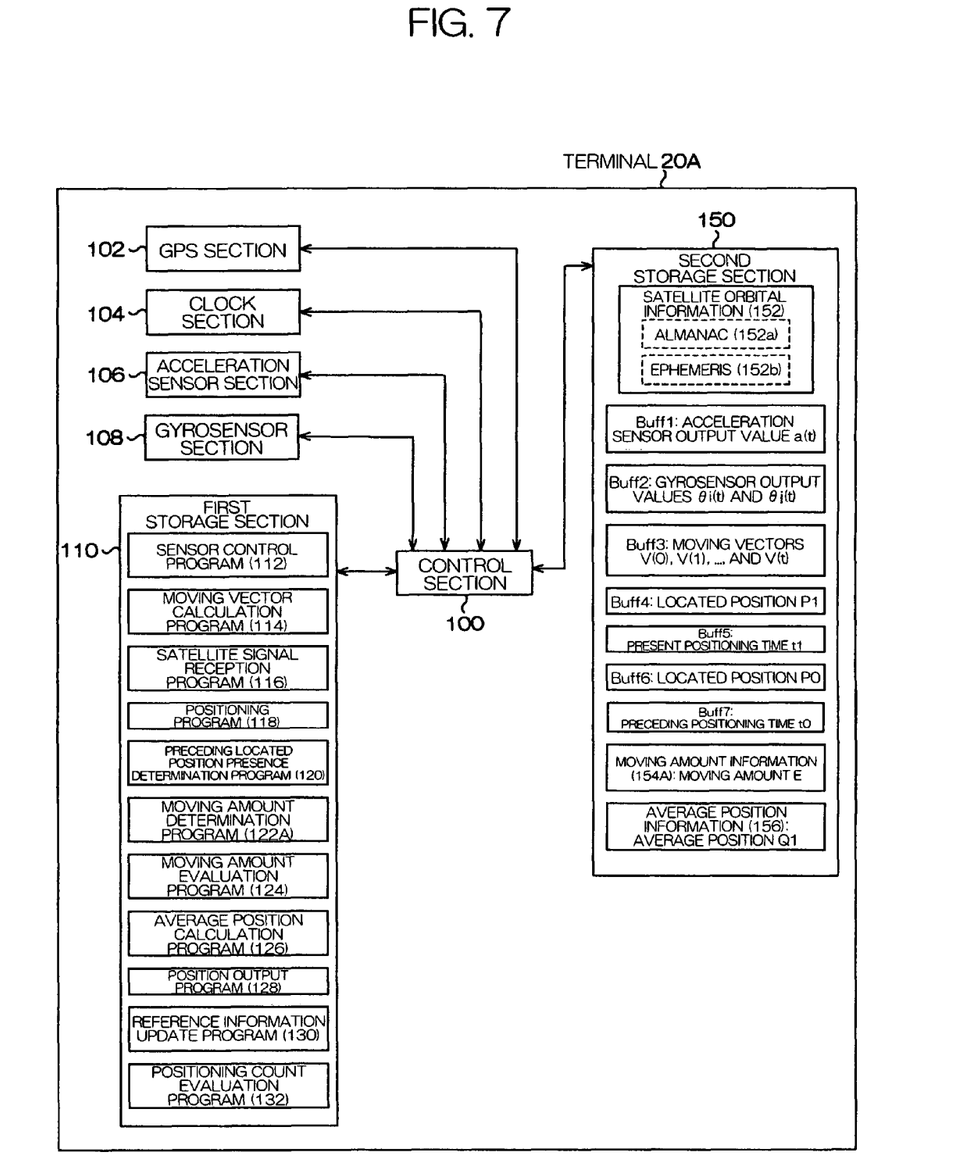
FIG. 7 is a schematic view showing the main software configuration of another terminal.

As shown in FIG. 7, the terminal 20A stores a moving vector calculation program 114 in the first storage section 110. The moving vector calculation program 114 is a program for causing the control section 100 to calculate the moving vector of the terminal 20A from activation of the terminal 20.

The control section 100 integrates the acceleration indicated by the acceleration sensor output value a(t) to calculate the velocity v(t) at the time t.

The control section 100 calculates the moving vector V(t) from the velocity v(t) and the gyrosensor output values θi(t) and θj(t).

The control section 100 generates the moving vector V(t) every 100 milliseconds and stores the moving vector V(t) in the buffer Buff3, for example.

As shown in FIG. 7, the terminal 20A stores a moving amount determination program 122A in the first storage section 110. The moving amount determination program 122A is a program for causing the control section 100 to determine the moving amount E of the terminal 20 in a period between the preceding positioning time t0 and the present positioning time t1. The moving amount determination program 122A and the control section 100 also exemplify the moving amount determination section.

Figure 8:
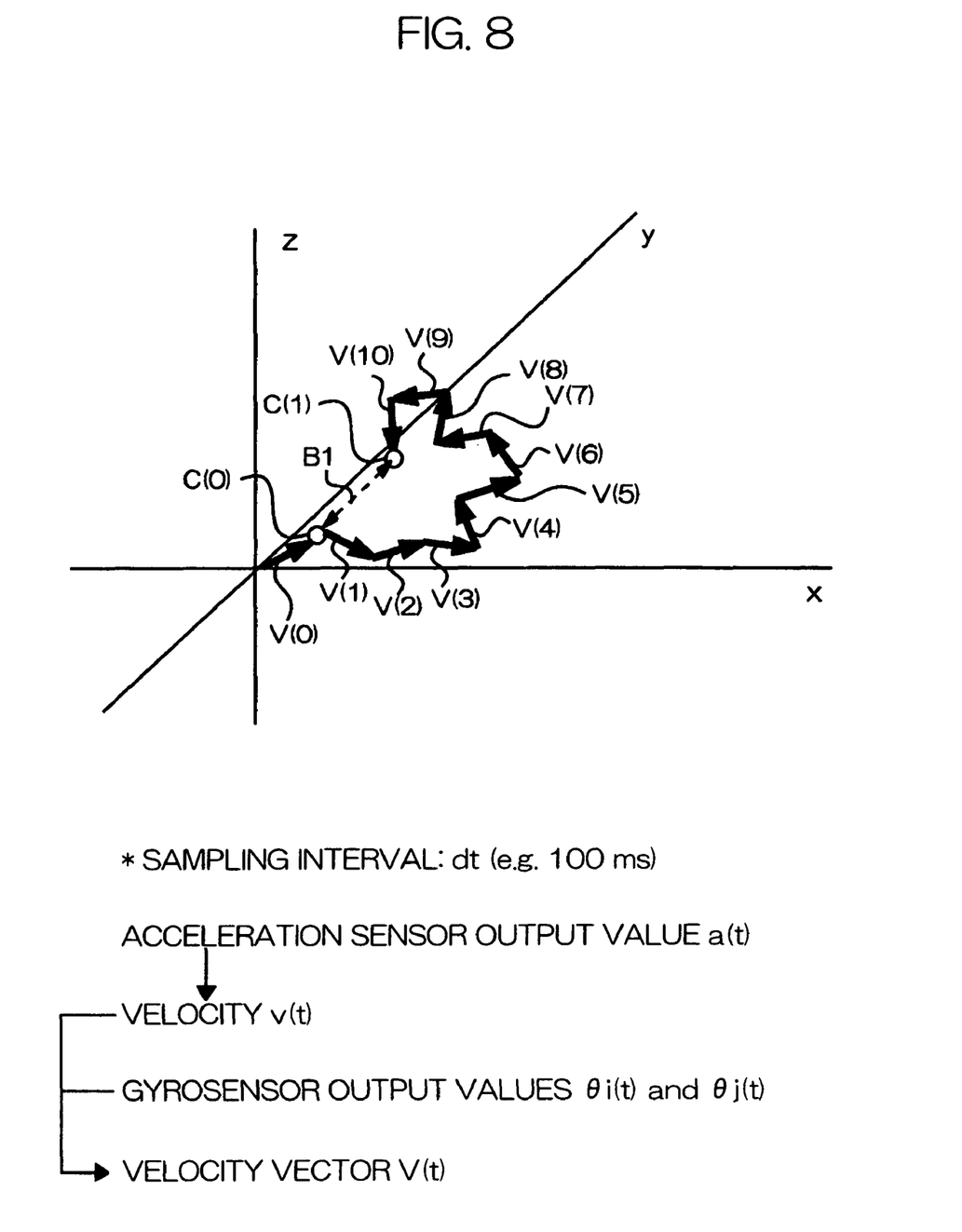
FIG. 8 is a view illustrative of a moving amount determination program.

FIG. 8 is a view illustrative of the moving amount determination program 122A.

The control section 100 composes the velocity vector (VI) and the like generated in a period between the preceding positioning time t0 and the present positioning time t1, and calculates the distance between the base point and the end point.

For example, when the velocity vector at the preceding positioning time t0 is V(1) and the velocity vector at the present positioning time t1 is V(10), as shown in FIG. 8, the control section 100 composes the velocity vectors V(1) to V(10).

The control section 100 calculates the distance B1 between the base point C(0) of the velocity vector V(1) and the end point C(1) of the velocity vector V(10).

The control section 100 sets the distance B1 as the moving amount E, and stores the moving amount information 154 indicating the moving amount E in the second storage section 150.

The control section 100 determines whether or not the moving amount E is within 1 meter (m) based on the moving amount evaluation program 124.

When the control section 100 has determined that the moving amount E is within 1 meter (m), the control section 100 calculates and outputs the average position Q1.

According to the terminal 20A, when the terminal 20A merely makes a round trip near a single point, the moving amount E becomes small even if the moving velocity is high.

This makes it possible to more accurately reflect the moving state of the terminal 20A.

(Program, Computer-Readable Recording Medium, and the Like)

A positioning control program may be provided which causes a computer to execute the located position calculation step, the moving amount acquisition step, the moving amount evaluation step, the average position calculation step, the position output step, and the like of the above-described operation example.

A computer-readable recording medium having such a positioning control program recorded thereon and the like may also be provided.

A program storage medium used to install the positioning control program and the like in a computer to allow the positioning control program and the like to be executable by the computer may be implemented by a package medium such as a flexible disk (e.g. floppy disk®), a compact disc read only memory (CD-ROM), a compact disc-recordable (CD-R), a compact disc-rewritable (CD-RW), or a digital versatile disc (DVD), a semiconductor memory, a magnetic disk, or a magnetooptical disk in which the program is stored temporary or permanently, or the like.

The invention is not limited to the above embodiments. The above embodiments may be employed in combination.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A positioning device comprising:

an acceleration sensor;

a gyrosensor;

a moving amount determination section that successively calculates a moving vector in a period between a proceeding positioning time and a present positioning time based on values output from the acceleration sensor and the gyrosensor, and determines a distance between a base point of a first moving vector and an end point of a last moving vector when sequentially connecting the calculated moving vectors to be a moving amount of the device in a period between the preceding positioning time and the present positioning time;

a moving amount evaluation section that determines whether or not the moving amount is within a predetermined allowable moving range;

a positioning section that locates a position of the device based on a satellite signal which is a signal from a positioning satellite; and a position output section that outputs a preceding located position when the moving amount evaluation section has determined that the moving amount is within the predetermined allowable moving range.

2. A positioning device comprising:

an acceleration sensor;

a gyrosensor;

a moving amount determination section that successively calculates a moving vector in a period between a proceeding positioning time and a present positioning time based on values output from the acceleration sensor and the gyrosensor, and determines a distance between a base point of a first moving vector and an end point of a last moving vector when sequentially connecting the calculated moving vectors to be a moving amount of the device in a period between the preceding positioning time and the present positioning time;

a moving amount evaluation section that determines whether or not the moving amount is within a predetermined allowable moving range;

a positioning section that locates a position of the device based on a satellite signal which is a signal from a positioning satellite;

an average position calculation section that calculates an average position by averaging a preceding located position and a present located position when the moving amount evaluation section has determined that the moving amount is within the predetermined allowable moving range; and a position output section that outputs the average position.

3. The positioning device as defined in claim 1, wherein the position output section outputs a present located position when the moving amount evaluation section has determined that the moving amount is outside the predetermined allowable moving range.

4. The positioning device as defined in claim 2, wherein the position output section outputs a present located position when the moving amount evaluation section has determined that the moving amount is outside the predetermined allowable moving range.

5. A method of controlling a positioning device comprising:

a moving amount determination step of successively calculating a moving vector in a period between a preceding positioning time and a present positioning time based on values output from an acceleration sensor and a gyrosensor, and determining a distance between a base point of a first moving vector and an end point of a last moving vector when sequentially connecting the calculated moving vectors to be a moving amount in a period between the preceding positioning time and the present positioning time;

a moving amount evaluation step of determining whether or not the moving amount is within a predetermined allowable moving range;

a positioning step of locating a present position based on a satellite signal which is a signal from a positioning satellite; and a position output step of outputting a preceding located position when the moving amount has been determined to be within the predetermined allowable moving range in the moving amount evaluation step.

6. A method of controlling a positioning device comprising:

a moving amount determination step of successively calculating a moving vector in a period between a preceding positioning time and a present positioning time based on values output from an acceleration sensor and a gyrosensor, and determining a distance between a base point of a first moving vector and an end point of a last moving vector when sequentially connecting the calculated moving vectors to be a moving amount in a period between the preceding positioning time and the present positioning time;

a moving amount evaluation step of determining whether or not the moving amount is within a predetermined allowable moving range;

a positioning step of locating a present position based on a satellite signal which is a signal from a positioning satellite;

an average position calculation step of calculating an average position by averaging a preceding located position and a present located position when the moving amount has been determined to be within the predetermined allowable moving range in the moving amount evaluation step; and a position output step of outputting the average position.

7. The method of controlling a positioning device as defined in claim 5, wherein the present located position is output in the position output step when the moving amount has been determined to be outside the predetermined allowable moving range in the moving amount evaluation step.

8. The method of controlling a positioning device as defined in claim 6, wherein the present located position is output in the position output step when the moving amount has been determined to be outside the predetermined allowable moving range in the moving amount evaluation step.

9. A positioning control program causing a computer which includes an acceleration sensor and a gyrosensor to execute:

a moving amount determination step of successively calculating a moving vector in a period between a preceding positioning time and a present positioning time based on values output from the acceleration sensor and the gyrosensor, and determining a distance between a base point of a first moving vector and an end point of a last moving vector when sequentially connecting the calculated moving vectors to be a moving amount of the computer in a period between the preceding positioning time and the present positioning time;

a moving amount evaluation step of determining whether or not the moving amount is within a predetermined allowable moving range;

a positioning step of locating a position of the computer based on a satellite signal which is a signal from a positioning satellite; and a position output step of outputting a preceding located position when the moving amount has been determined to be within the predetermined allowable moving range in the moving amount evaluation step.

10. A positioning control program causing a computer which includes an acceleration sensor and a gyrosensor to execute:

a moving amount determination step of successively calculating a moving vector in a period between a preceding positioning time and a present positioning time based on values output from the acceleration sensor and the gyrosensor, and determining a distance between a base point of a first moving vector and an end point of a last moving vector when sequentially connecting the calculated moving vectors to be a moving amount of the computer in a period between the preceding positioning time and the present positioning time;

a moving amount evaluation step of determining whether or not the moving amount is within a predetermined allowable moving range;

a positioning step of locating a position of the computer based on a satellite signal which is a signal from a positioning satellite;

an average position calculation step of calculating an average position by averaging a preceding located position and a present located position when the moving amount has been determined to be within the predetermined allowable moving range in the moving amount evaluation step; and a position output step of outputting the average position.

11. A computer-readable recording medium having recorded thereon a positioning control program, the positioning control program causing a computer which includes an acceleration sensor and a gyrosensor to execute:

a moving amount determination step of successively calculating a moving vector in a period between a preceding positioning time and a present positioning time based on values output from the acceleration sensor and the gyrosensor, and determining a distance between a base point of a first moving vector and an end point of a last moving vector when sequentially connecting the calculated moving vectors to be a moving amount of the computer in a period between the preceding positioning time and the present positioning time;

a moving amount evaluation step of determining whether or not the moving amount is within a predetermined allowable moving range;

a positioning step of locating a position of the computer based on a satellite signal which is a signal from a positioning satellite; and a position output step of outputting a preceding located position when the moving amount has been determined to be within the predetermined allowable moving range in the moving amount evaluation step.

12. A computer-readable recording medium having recorded thereon a positioning control program, the positioning control program causing a computer which includes an acceleration sensor and a gyrosensor to execute:

a moving amount determination step of successively calculating a moving vector in a period between a preceding positioning time and a present positioning time based on values output from the acceleration sensor and the gyrosensor, and determining a distance between a base point of a first moving vector and an end point of a last moving vector when sequentially connecting the calculated moving vectors to be a moving amount of the computer in a period between the preceding positioning time and the present positioning time;

a moving amount evaluation step of determining whether or not the moving amount is within a predetermined allowable moving range;

a positioning step of locating a position of the computer based on a satellite signal which is a signal from a positioning satellite;

an average position calculation step of calculating an average position by averaging a preceding located position and a present located position when the moving amount has been determined to be within the predetermined allowable moving range in the moving amount evaluation step; and a position output step of outputting the average position.

* * * * *